United States Patent [19]

Kobsa et al.

[11] Patent Number: 5,361,279

[45] Date of Patent: Nov. 1, 1994

[54] INTERNAL CONTROL ROD DRIVE FOR A BWR

[75] Inventors: Irvin R. Kobsa, San Jose; Charles W. Relf, Sunnyvale; John C. Carruth, San Jose, all of Calif.

[73] Assignee: General Electric Company, San Jose, Calif.

[21] Appl. No.: 76,229

[22] Filed: Jun. 14, 1993

[51] Int. Cl.⁵ .............................................. G21C 7/16
[52] U.S. Cl. ...................................................... 376/230
[58] Field of Search ................ 376/228, 229, 230, 231, 376/260; 976/DIG. 127

[56] References Cited

U.S. PATENT DOCUMENTS

| | | | |
|---|---|---|---|
| 4,030,972 | 6/1977 | Groves | 376/230 |
| 5,120,489 | 6/1992 | Dillmann | 376/230 |

*Primary Examiner*—Daniel D. Wasil
*Attorney, Agent, or Firm*—J. S. Beulick

[57] ABSTRACT

A hydraulically based control rod drive system that is contained within the pressure vessel is disclosed for positioning the control rods relative to fuel rods positioned in a nuclear core of a boiling water reactor. Hydraulic jacks mounted on an open grid located entirely within the pressure vessel at a position above the nuclear core are used to position the control rods. Suitable jack and grid structures, as well as a hydraulic control arrangements are described.

21 Claims, 7 Drawing Sheets

INTERNAL CONTROL ROD DRIVE FOR A BWR

BACKGROUND OF THE INVENTION

The present invention relates generally to the drive mechanism that positions control rods within the nuclear core of a boiling water reactor. More particularly, a control rod drive which is completely contained within the reactor pressure vessel is described.

In boiling water reactors, the control rod drives are traditionally positioned outside and below the reactor pressure vessel. Since the control rods are each positioned within the pressure vessel, each drive must include a coupling that penetrates the pressure vessel. This design has several disadvantages. One of the most noticeable drawbacks is the requirement that the containment structure (as well as the reactor pressure vessel) must be very high in order to provide sufficient storage space for the control rods below the reactor fuel bundles. Another major drawback is the existence of a very large number of items that must penetrate the reactor walls (i.e. the connecting rods).

SUMMARY OF THE INVENTION

It is a general objective of the present invention to provide an internal control rod drive arrangement for a boiling water reactor that permits more compact pressure vessel designs and substantially reduces the number of vessel penetrations required to facilitate control of the control rod positioning.

To achieve the foregoing and other objects and in accordance with the purpose of the present invention, a control rod drive system is disclosed for positioning the control rods relative to fuel rods positioned in a nuclear core of a boiling water reactor. In a first aspect of the invention the control rod drives each include a jack rod and a hydraulic jack. The jack rod is coupled to a control rod. It may be either integrally formed with the control rod or coupled via a connector. The hydraulic jack is positioned within the pressure vessel above the nuclear core. The jack is capable of lifting, lowering and holding the jack rod to position the control rod.

In a preferred embodiment, the jack includes a hydraulically operated holding mechanism and a hydraulically operated lifting mechanism. The holding mechanism has holders arranged to selectively engage the jack rod to hold the jack rod in place. The lifting mechanism includes lifters arranged to selectively engage the jack rod and a lift cylinder arranged to lift or lower the jack rod when the holders are disengaged and the lifters are engaged.

In a second preferred aspect of the invention a hydraulically operated hold control valve is also provided for each control rod drive. The use of hold control valves facilitates the use of an addressing system that dramatically reduces the number of hydraulic lines that are required to operate the system. The hold control valve is positioned within the jack and is moveable between an open position and a closed position. In the open position a communication path is formed between a first hydraulic line and a holding line. The holding mechanism includes a holding piston arranged to move the holders between engaged and disengaged positions. A A first side of the holding piston is influenced by the first hydraulic line and a second side of the piston is influence by the holding line. The lifting cylinder is influenced by a second hydraulic line.

In a preferred embodiment, the hold control valve includes a plunger that is moveable between an open and a closed position and a biasing spring for biasing the plunger towards the closed position. Additionally, both the first and the second hydraulic lines are arranged to influence the plunger in a direction towards the open position.

In a third aspect of the invention, an open grid is provided within the pressure vessel at a position above the nuclear core of the boiling water reactor. The grid includes a multiplicity of mounting surfaces with each mounting surface supporting one of the hydraulic jacks. The hydraulic lines required to control the jacks may be strung along the sides of the grid beams.

In one preferred embodiment, each mounting surface includes an alignment foot that mates with an associated alignment recess in the associated control rod drive and a pair of spaced apart raised hydraulic ports that mate with associated port recesses in the associated control rod drive. The alignment foot and the raised hydraulic ports cooperate to align the control rod drive. In a separate preferred embodiment, the control rods are cruciform in shape and each mounting surface and each control rod drive has a cruciform opening therein through which the control rod may be withdrawn during maintenance operations.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE INVENTION

Figure 1:
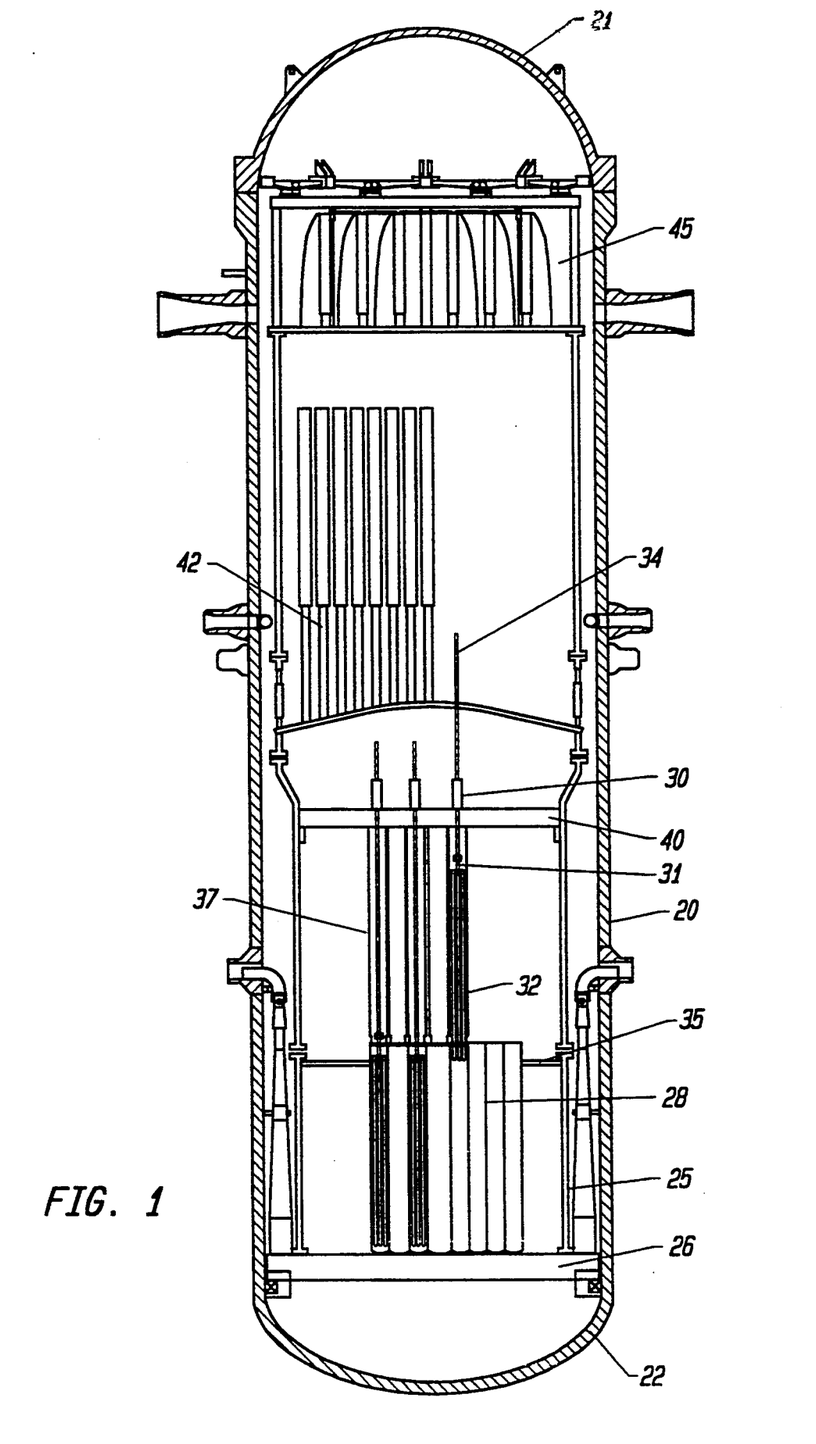
FIG. 1 is a diagrammatic cross sectional side view of a boiling water reactor pressure vessel that incorporates the present invention.

FIG. 1 illustrates a boiling water reactor pressure vessel suitable for housing the internal control rod drive of the present invention. The pressure vessel 20 has a top head 21 and a bottom head 22. The nuclear core 25 is positioned on a core plate 26. A matrix of fuel bundles 28 is arranged within the core. The bundles are spaced sufficiently so that a cruciform shaped control rod blade 32 of control rod 31 can be slid back and forth in the region between the channels to control the reactor output. A top guide plate 35 is positioned near the top end of the fuel bundles to help position the channels. The channels may extend well above the fuel bundles to form a chimney 37.

Of course, the invention can be used with other conventional reactors designs, as for example, designs wherein the chimneys are eliminated and/or larger channels are provided that contain a plurality of fuel bundles and/or in conjunction with a cluster type core wherein finger type control rods are used.

Figure 2:
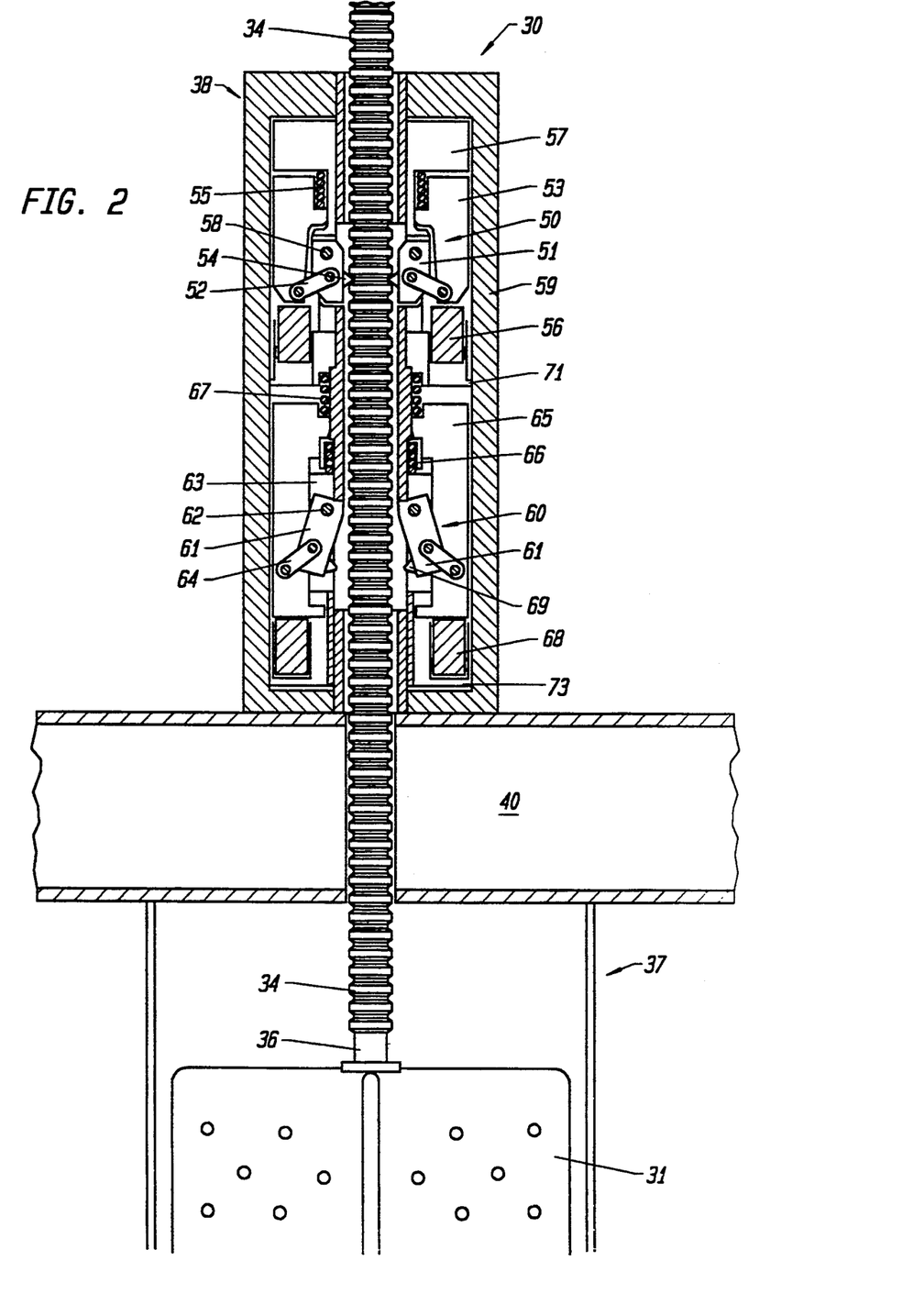
FIG. 2 is a diagrammatic cross sectional side view of a hydraulic jack control rod drive in accordance with the present invention.

An open control rod drive grid 40 is positioned a distance above the top guide plate 35. The spacing between the tops of the fuel bundles and the grid 40 is sufficient so that substantially the entire control rod blade 32 can be lifted above the core 25. A multiplicity of control rod drives (CRDs) 30 are mounted on the control rod drive grid as best seen in FIG. 2. Specifically, one CRD 30 is positioned above each control rod 31.

In the embodiment of the invention shown in FIG. 1, a multiplicity of standpipes 42 are positioned somewhat above the control rod drive grid 40 with each standpipe being arranged to receive the jack rod 34 of an associated control rod drive 30. The standpipes 42 are provided with an internal guide tube to contain the jack rods and to control flow, induced vibration in the jack rods. In alternative embodiments, these guide tubes could be arranged between the standpipes. Conventional steam separators 44 are positioned above the stand pipes 42 and a conventional steam dryer 45 is positioned above the steam separators and typically within the top head 21.

Referring next to FIG. 2, the construction of a first embodiment of the control rod drives 30 will be described. Each control rod drive 30 includes a jack rod 34, a connector 36 and a hydraulic jack 38. The connector 36 is arranged to couple the jack rod 34 to the control rod 31. In alternative embodiments, the jack rod could be formed integrally with the control rod. The jack rod 34 takes the form of a notched shaft which is designed to cooperate with the latches of the hydraulic jack 38 to create a ratchet type mechanism.

The hydraulic jack 38 includes a holding mechanism 50 for holding the jack rod 34 in a stationary position and a lifting mechanism 60 for lifting and lowering the jack rod 34. Both the lifting mechanism and the holding mechanism are housed within a casing 59 and are hydraulically operated. The holding mechanism 50 includes a pair of pivotally mounted latch fingers 51 that are respectively coupled to sliding members 53 by pivotal linkages 52 and to a fixed support 57 by pivots 58. The latch fingers 51 each include a holder 54 that is adapted to engage the notches in the jack rod 34. In the described embodiment, the holders 54 take the form of holding pins, but it should be appreciated that latches, pins or other suitable mechanism may all be used as holders within the scope of this invention. The sliding members 53 are biased in a downward direction by biasing spring 55. A hold piston 56 is positioned under the sliding members 53 for pushing the sliding members upward. The hold piston 56 in turn is supplied by a hydraulic holding line 71. Thus, the sliding members 53 are biased downward by the biasing spring 55, and forced upward by the hold piston 56 when the holding line 71 is pressurized.

When no pressure is exerted by the hold piston 56 against the sliding members 53, then the biasing spring 55 will push the sliding members downward. This movement will release the latch fingers 51 which in turn release the jack rod. When a significant pressure is applied in the hydraulic holding line 71, then the hold piston 56 pushes the sliding members 53 upward against the force of the biasing spring 55, thereby causing the latch fingers 51 to pivot into the engaging position which firmly holds the jack rod in place.

The lifting mechanism 60 has a pair of latch fingers 61 that are respectively pivotally mounted to a pair of sliders 63 by pivots 62. The latch fingers 61 each have a lifter 69 thereon that is adapted to engage the notches in the jack rod 34. Like the holders 54, the lifters 69 in the described embodiment are lifting pins but may take the form of latches or other suitable mechanisms. The sliders 63 are free to move a limited distance within casing 59. The free end of each latch finger 61 is coupled to a sliding member 65 by a linkage 64 that is pivotal on each end. The sliders 63 are biased in a downward direction by biasing spring 66. The sliding members 65 are each biased in a downward direction by a biasing spring 67 positioned between the housing and the lifting mechanism. A lift piston 68 is positioned under the sliding members 65 such that when actuated, it can push the sliding members upward against the force of biasing spring 67. This action serves to pivot the latch fingers from a release position into an engaging position.

When no pressure is exerted by the lift piston 68 against the sliding members 65, then the biasing spring 67 will push the sliding members 65 downward. This movement will release the latch fingers 61 which in turn will release the jack rod. When a significant pressure is applied in the hydraulic lifting line 73, then the lift piston 68 pushes the sliding members 65 upward against the force of the biasing spring 67, thereby causing the latch fingers 61 to pivot into the engaging position. When the holding pins 54 are released and the lifting pins 69 are engaged, then the movement of the jack rod can be controlled by the pressure within lifting line 73. Specifically, if a high pressure is applied against the lift piston 68, then the piston will stroke upward with the lifting pins 69 engaged, thereby moving the sliders upwards against the springs 66, which lifts the jack rod by a notch. On the other hand, if only a moderate pressure is applied against the lift piston 68, then the weight of the control rod combined with the force of spring 66 will push the sliders 63 downward and thus the lift piston will stroke downward. In this manner the jack rod can be lowered by a notch.

The described embodiment requires two hydraulic lines to operate each jack mechanism. By way of example, in a reactor that employs two hundred cruciform shaped control rods, two hundred control rod drives may be used. In such an embodiment, four hundred hydraulic lines would be necessary.

Figure 3:
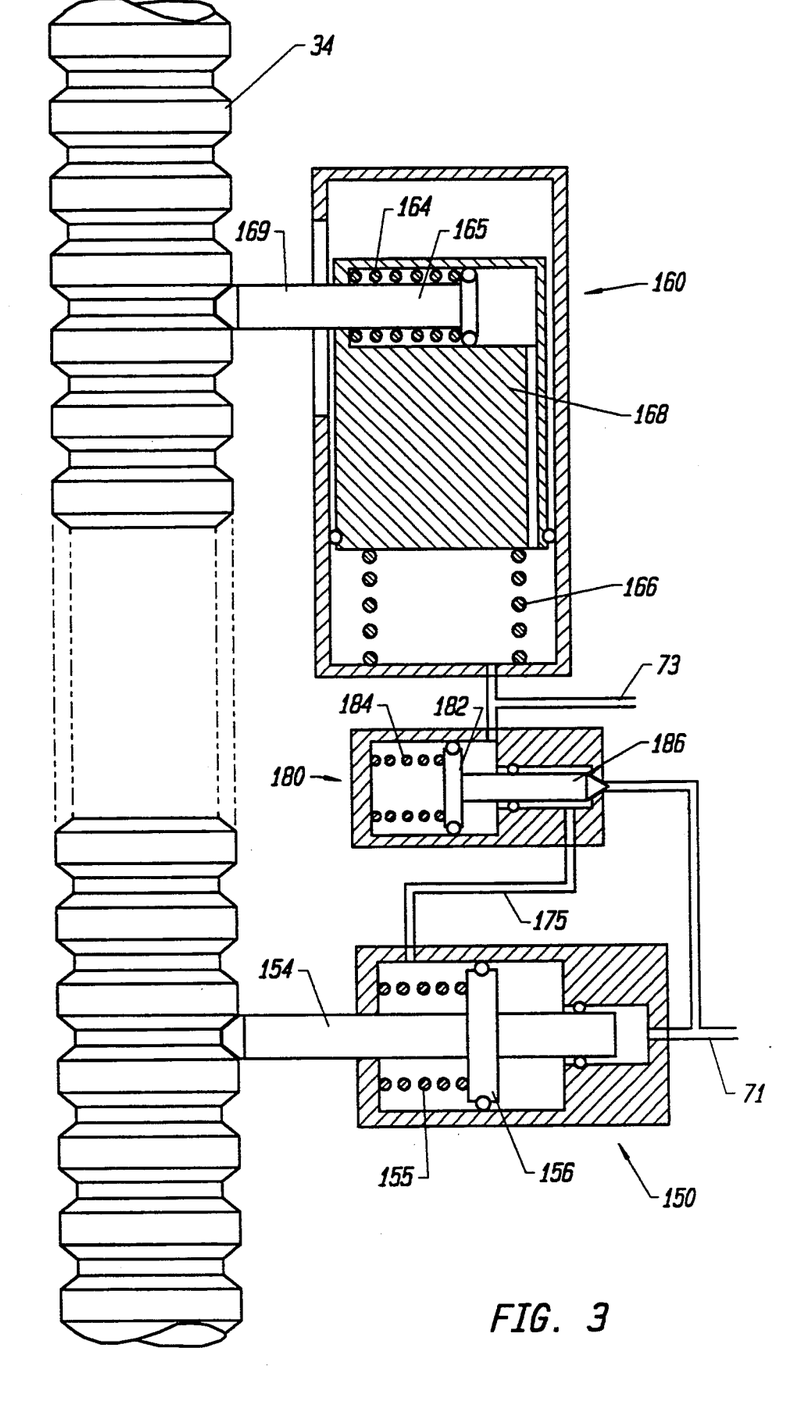
FIGS. 3 is a schematic representation illustrating an alternative embodiment of the control rod drive.

An alternative embodiment of the invention which uses an addressing system to reduce the number of hydraulic lines required will next be described referring to FIG. 3. In this embodiment, modified holding and lifting mechanisms are used and a hold control valve 180 is added to each drive. Specifically, the hold control valve 180 has a piston 182 that is biased in a first direction by biasing spring 184. The side of the piston opposite the biasing spring has a plunger 186 that has a much narrower diameter then the piston 182. The position of the piston is influenced by three factors. They include the biasing spring 184, the pressure in lifting line 73 which acts against the piston 182 in a direction opposite the biasing spring, and the pressure of the holding line 71 which also acts against the plunger 186 in a direction opposite to the biasing spring. The piston is moveable between open and closed positions. In the open position, a communication path is formed between the holding line 71 and a control line 175.

The piston 156 in holding mechanism 150 is influenced by three forces as well. These forces include a biasing spring 155, the pressure in control line 175 and the pressure in holding line 71. The biasing spring 155 and the pressure in control line 175 urge the hold piston 156 towards a disengaged position while the pressure in holding line 71 urges the piston towards a closed position. The surface area of the piston 156 that is influenced by the control line 175 is somewhat larger than the area influenced by holding line 71. The pressure in control line 175 will be very similar to the pressure in holding line 71 when the hold control valve 180 is opened. Therefore, the position of the hold piston 156 will effectively be determined by whether the hold control valve 180 is open, as long as there is pressure in holding line 71. If all pressure is removed from the holding line, the biasing spring 155 will move the piston to the withdrawn position.

The lifting mechanism 160 effectively includes a lifting piston 165 and a lift cylinder 168. The position of each of these components is influenced by the pressure in lifting line 73. The pin positioning piston 165 is influenced by a biasing spring 164 and the pressure in lifting line 73. Specifically, as long as there is a significant pressure within the lifting line, the pin positioning piston will remain in the engaged position. When pressure is removed from the lifting line, the lifting pins 169 will move to the disengaged position under the influence of biasing spring 164.

The lift cylinder 168 is influenced by a biasing spring 166 and the pressure in lifting line 73, as well as the engagement of the holding pins 154. Specifically, when the holding pins 154 are engaged, the jack rod will remain in place regardless of the pressure exerted in the lifting line 73. However, when the holding pins 154 are disengaged and the lifting pins 169 are engaged, then the full weight of the jack rod 34 and the control rod will be borne by the lift cylinder 168. In this case, if a high pressure is applied in lifting line 73, then the lift cylinder will stroke upward and the jack rod 34 will be lifted a notch. On the other hand, if a medium pressure is applied to the lifting line 73, then the weight of the control rod would cause the lift cylinder 168 to stroke downward, thereby lowering the control rod a notch.

With the described logic, if a high pressure is applied to both the lifting and holding lines, the jack rod 34 will be lifted one notch. Specifically, the hold control valve 180 is opened against the force of biasing spring 184, which introduces a high pressure in the region behind the holding piston 156. Thus, the holding piston 156 will stroke towards the disengaged position, which serves to release the holding pin 154 from the jack rod 34. On the other hand, the high pressure on the lifting piston 165 and the lift cylinder 168 causes the lifting pins 169 to engage the jack rod and the lifting cylinder to stroke upwards, thereby moving the jack rod upwards.

The jack rod 34 may be lowered a notch by keeping the pressure in the holding line 71 high while asserting a medium pressure in the lifting line 73. In this condition, the hold control valve is again opened by the combined forces of the pressures within the holding and lifting lines acting against the biasing spring 184. However since a medium pressure is asserted against the lifting piston, the weight of the control rod will stroke the lift cylinder downwards, which will step the jack rod down a notch.

If no pressure is applied to the lifting line, then the lifting piston 165 will disengage. At the same time, the hold control valve 180 will close and the pressure in the holding line will stroke the hold piston 156 which serves to lock the holding pin 154 in place. This is true regardless of whether a high or medium pressure is applied in the holding line 73. On the other hand, if no significant pressure is present on either the holding line or the lifting line, then the force of biasing spring 155 will stroke the holding piston to the right (as seen in FIG. 3) which releases the holding pin 154. Thus, when no pressure is applied to either line, both pins will release and gravity will cause the control rod to fall into the core. Thus, the system is failsafe in that in the event of a power loss or other control failure, the control rods will automatically descend into the core.

Any time that a medium pressure is applied to the holding line, the hold control valve 180 will be closed. Thus, the pressure of the holding line 71 will stroke the holding piston in a manner that moves the holding pin 154 into the engaged position. In this condition, regardless of the pressure on the lifting line, the jack rod will be firmly held in place.

Any time that the holding line does not have any pressure, the holding pin will disengage from the jack rod. In this condition the jack rod could be lifted or lowered by varying the pressure in the lifting line 73 between the high and medium pressures. However, in the current embodiment, this type of control is not used.

With the described arrangement, it can be seen that an addressing system can be arranged that would provide individual control of the control rod drives, but eliminate the need to use dedicated holding and lifting lines. Specifically, in such an addressing grid arrangement, a plurality of holding line are provided with each holding line being connected to a row of drives. Similarly, a plurality of lifting lines are provided with each lifting line being connected to a column of drives. In the steady state, the holding lines would be pressurized with a medium pressure, while the lifting lines would not be pressurized at all. As explained above, with this arrangement, all of the drives would hold their associated jack rod firmly in place. When a particular control rod is to be lifted or lowered, the pressure in its associated holding line is increased to a high pressure. The remaining holding lines remain at the medium pressure. The pressure in the selected control rods lifting line is then adjusted to either lift the control rod (by applying a high pressure) or to lower the control rod (by applying a medium pressure. The remaining lifting lines will remain unpressurized. It is noted that since all of the holding lines other than the selected holding line are at a medium pressure, their associated drives in the selected column will not move, regardless of the pressure in the selected lifting line. Similarly, since all of the lifting lines other than the selected lifting line are unpressurized, the unselected drives in the selected row will not move. Thus, with the described arrangement, true addressing can be used to control the control rod drives. With this arrangement, a total of 30 hydraulic lines (15 lifting lines and 15 holding lines) can be used to control a system having over 200 drives. It will be appreciated by those skilled in the art that this is a significant improvement and would substantially simplify the system's plumbing.

Figure 4:
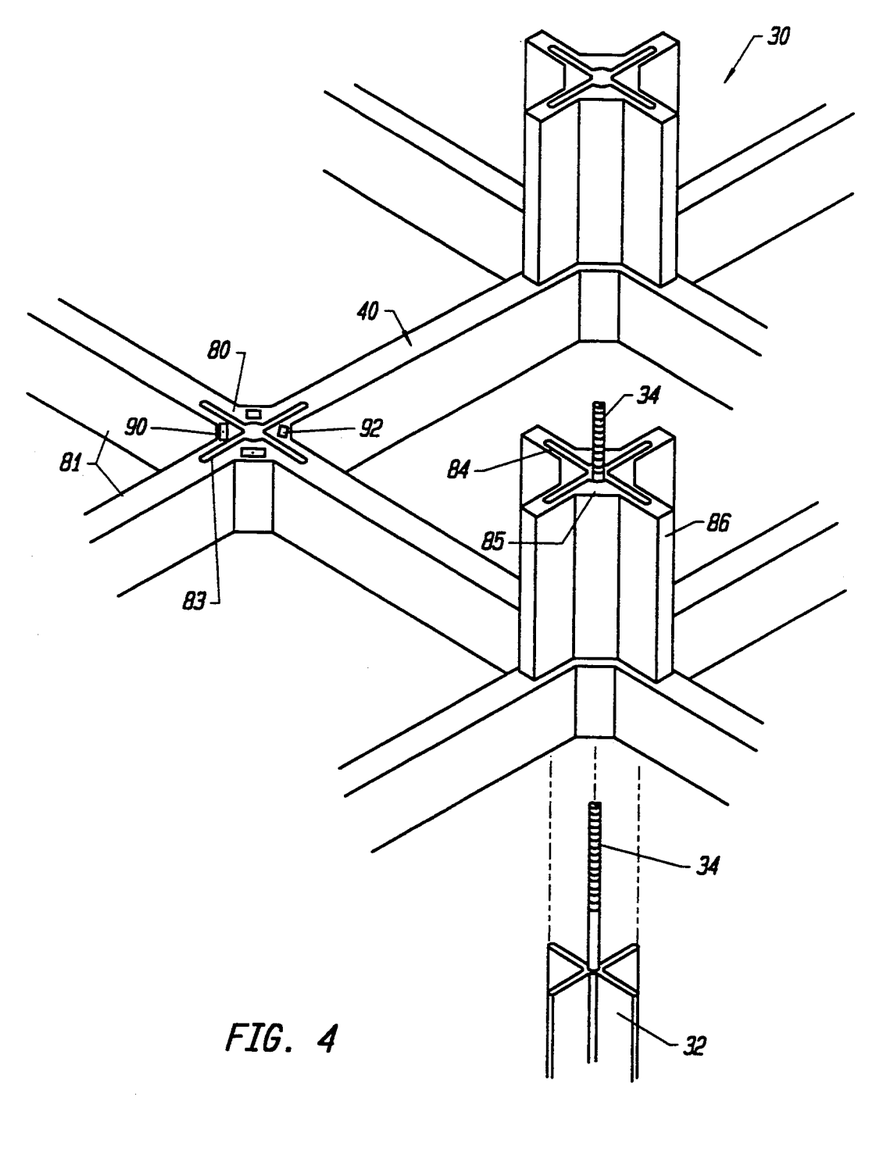
FIG. 4 is a diagrammatic perspective view of a first control rod drive embodiment mounted on a suitable drive grid.
Figure 5:
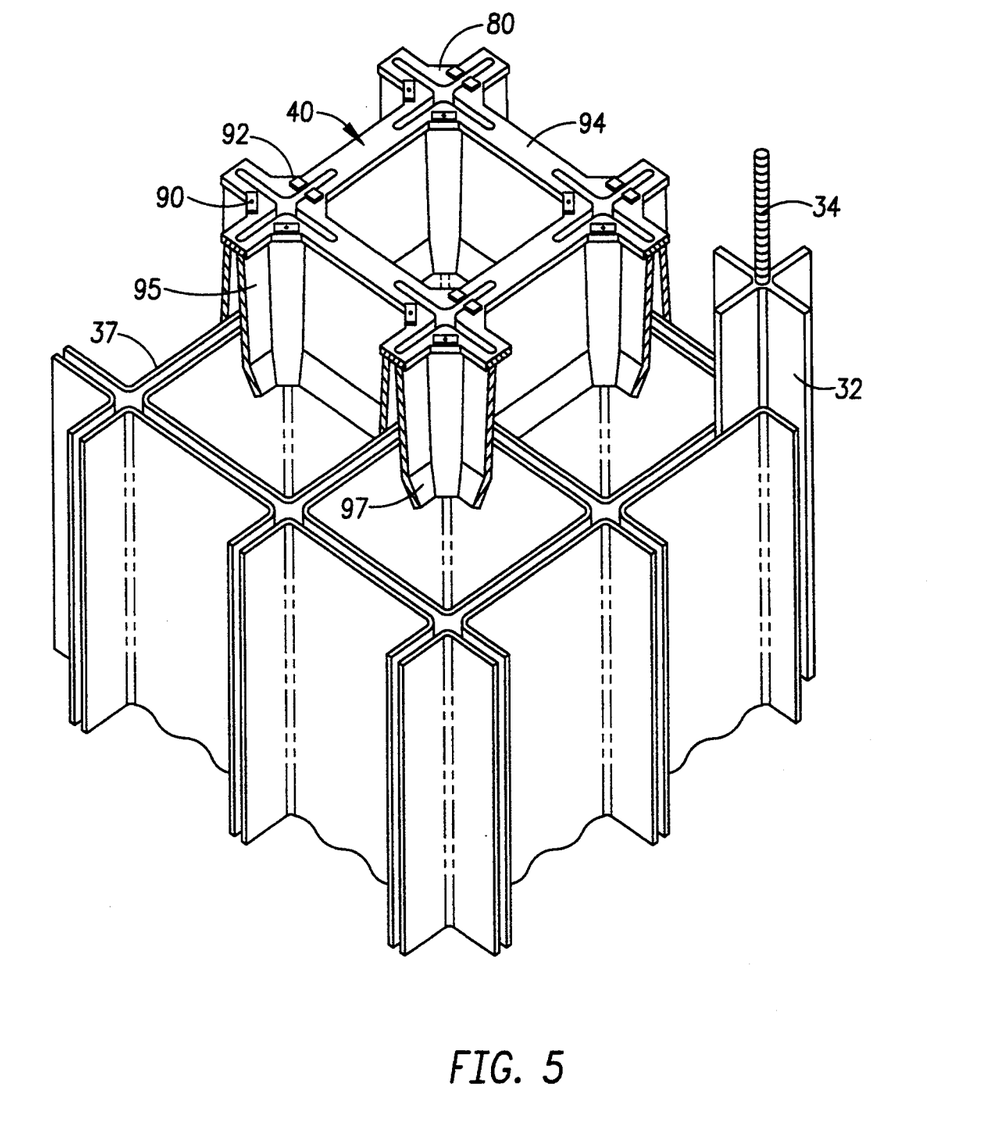
FIG. 5 is a diagrammatic perspective view of a portion of an alternative grid structure.
Figure 6:
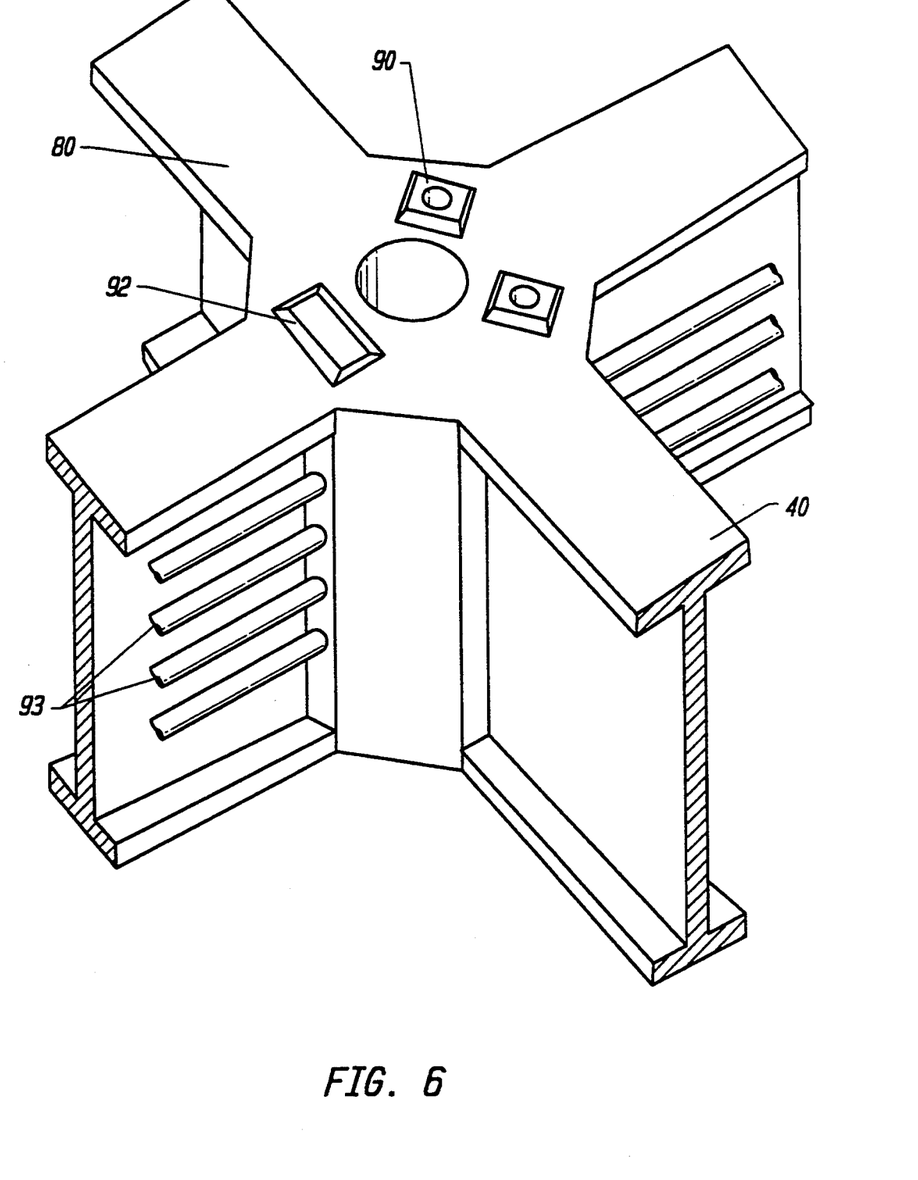
FIG. 6 is a diagrammatic perspective view of the mounting surface area of a third embodiment of the grid structure.

Referring next to FIGS. 4–6, a variety of control rod drive mounting arrangements will be described. The first described embodiment is suitable for use in a reactor that employs cruciform shaped control rods. As seen in FIG. 4, the grid 40 is an open matrix of beams 81 having mounting surfaces 80 formed at each beam intersection. The mounting surfaces are designed to correspond in shape to the shape of the bottom end of the control rod drive. A cruciform slot 83 is formed in each mounting surface 80 for receiving an associated control rod blade 32. Each control rod drive 30 also has a corresponding cruciform slot 84 through which the jack rod and the control rod blade may pass. In the illustrated embodiment, the cross section of the control rod drive casings 59, and the mounting surface are substantially cruciform in shape as seen in the drawings. The lifting and holding mechanisms are positioned in the region 85 formed between adjacent arms 86 of the cruciform casing.

The mounting surface 80 includes a pair of raised hydraulic ports 90 and a pair of raised mounting guides 92. The hydraulic ports 90 are designed to fit into matching female ports on the bottom surface of the control rod drive. Similarly, the mounting guides are received by matching indentations in the bottom surface of the control rod drive. Thus, the raised ports 90 and the raised mounting guides 92 cooperate to position the drive 30 on the mounting surface. Then a plurality of bolts or other fasteners (not shown) are used to secure the drive to the mounting surface. The hydraulic supply lines 93 (which include holding lines 71 and lifting lines 73) may be strung along the sides of the beams 81.

An alternative embodiment of the grid 40 is shown in FIG. 5. This embodiment also has an open matrix structure and is adapted for use in a system having large channels with chimneys extending therefrom and wherein each channel houses a group of four fuel bundles. The control rods used in this embodiment are designed to extend into the spaces between adjacent fuel channels, as seen in FIG. 5. In this embodiment, the grid 40 takes the form of a top beam grid having a multiplicity of mounting surfaces 80 that are similar to those described above with respect to the previous embodiment.

A plurality of side beams 95 extend downward from the top beams 94. The side beams extend outward in pairs that run in the direction of each arm 86 of the cruciform drive casing. The parallel side beams are spaced apart a distance that is slightly wider than the walls of chimney 37 and have flared lowered ends 97 that insure an easy fit over the top end of the chimneys. The grid is positioned such that the top of the chimneys are positioned slightly below the top beams 94. With this arrangement, during installation the grid can simply be lowered into place over the top edge of the chimney walls. This permits replacement of the chimneys upon removal of the top beam grid.

Figure 7:
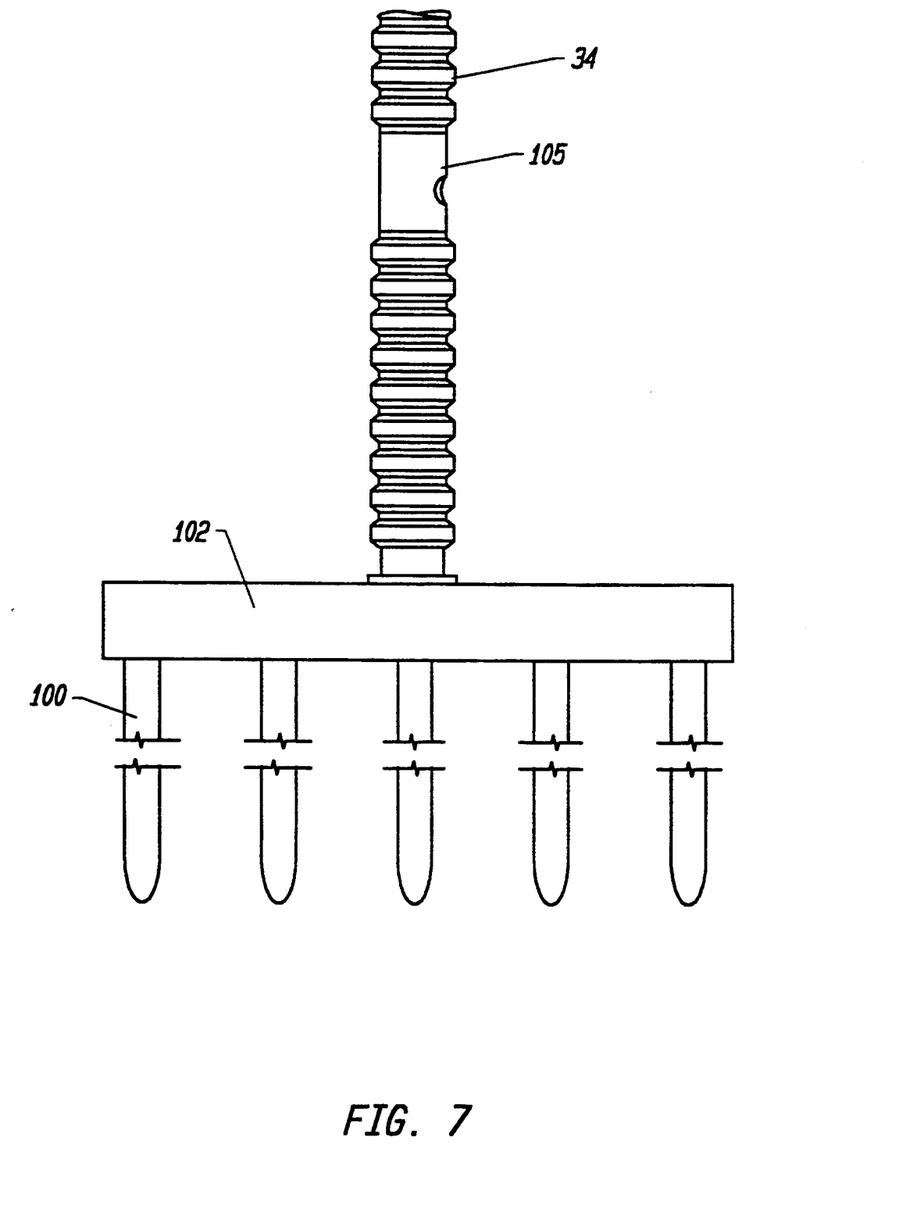
FIG. 7 is a schematic side view of a suitable jack rod coupling for a cluster type control rod.

Another alternative grid structure is shown in FIGS. 6 and 7. This embodiment is particularly well adapted for use in cluster type core configurations. In such configurations, it is advantageous if each jack rod 34 carries a plurality of finger type control rods 100 using a spider 102 positioned below the grid 40, as best seen in FIG. 7. The holes in the center of the mounting surface 80 and the drive 30 are each cylindrical in nature. As such, they only pass the jack rod itself. As best seen in FIG. 7, a hydraulic coupling 105 can be used to connect the jack rod 34 to the spider 102. The grid takes the form of an open matrix formed by I-beams. The positioning and mounting of the drive is accomplished in the same manner as the previously described grids wherein raised mounting guides 92 and raised hydraulic ports 90 cooperate with matching recesses and recessed ports on the drive to position the drive and bolts or other fasteners are used to secure the drive. The hydraulic lines 93 are strung along the web portion of the I-beam. In other respects, the grid is similar to those previously described.

The described hydraulic jack can be very compact in size. By way of example, a suitable overall drive height is about two feet. The reduced size of the CRD permits a substantial decrease in the required pressure vessel and containment building heights. By way of example, the described control rod drive system has the potential of reducing the containment height by three times the core height (i.e. approximately 36 feet) and the pressure vessel height by one core length when compared to conventional BWR control rod drive systems. The use of internal jacks also has the advantage of significantly reducing the vessel penetrations in both size and number. By way of example, four penetrations of less than 10 inches in diameter around the periphery of the pressure vessel would be sufficient to handle all of the required hydraulic lines for an array of 200 control rod drives even if two lines are provided for each drive. This must be compared with the 200 six-inch-diameter penetrations that would be required for conventional CRDs. This reduces vessel fabrication costs and significantly reduces the amount of in service inspection required. The size of the openings is even further reduced if the described addressing system is used. By way of example, just two four-inch-diameter penetrations would be sufficient to control 200 control rod drives if the addressing system were used.

The described control rod drive is failsafe in operation. Thus, in the event of a rupture of one of the lines or a loss of pressure, the control rods would automatically fall into the core. Since the drive is internal to the reactor pressure vessel, none of the components need to be pressure retaining, which serves to substantially reduce the cost of the drives themselves. Although only a few embodiments of the invention have been described, it should be understood that the present invention may be embodied in many other specific forms without departing from the spirit or scope of the invention. Therefore, the present examples are to be considered as illustrative and not restrictive, and the invention is not to be limited to the details given herein, but may be modified within the scope of the appended claims.

We claim:

1. A control rod drive for vertically positioning a control rod relative to fuel rods arranged in a fuel core of a nuclear reactor having a pressure vessel that contains said fuel core, comprising:

a jack rod suitable for being coupled to the control rod; and a hydraulic jack positioned within said pressure vessel above said fuel core, said hydraulic jack being capable of lifting, lowering and holdings said jack rod to regulate the position of the control rod, wherein said jack comprises:

a hydraulically operated holding mechanism having holders arranged to selectively engage said jack rod to hold said jack rod in place; and a hydraulically operated lifting mechanism having lifters arranged to selectively engage said jack rod and a lift cylinder arranged to lift said lifters and said jack rod therewith when said holders are disengaged and said lifters are engaged.

2. A control rod drive as recited in claim 1, further comprising a hold control valve that is moveable between an open position and a closed position wherein in said open position a communication path is formed between a first hydraulic line and a control line, and wherein:

said holding mechanism further comprises a holding piston arranged to move said holders between engaged and disengaged positions, a first side of said holding piston being influenced by the pressure in said first hydraulic line and a second side of said piston being influenced by the pressure in said control line; and said lifting cylinder is influenced by the pressure in a second hydraulic line.

3. A control rod drive as recited in claim 2, wherein said hold control valve comprises:

a plunger that is moveable between an open position and a closed position;

biasing means for biasing said plunger towards said closed position; and wherein both said first and said second hydraulic lines are arranged to influence said plunger in a direction towards said open position.

4. A control rod drive system for vertically positioning a plurality of control rods relative to a plurality of fuel rod bundles arranged in a fuel core of a nuclear reactor having a pressure vessel that contains said fuel core, comprising:

an open grid mounted with said pressure vessel at a position above said fuel core, said grid comprising a plurality of mounting surfaces;

a plurality of jack rods, each one of said jack rods being coupled to a corresponding one of said plurality of control rods; and a plurality of hydraulic jacks, each one of said hydraulic jacks being attached to said grid on a corresponding one of said plurality of mounting surfaces and comprising a hydraulically operated means for holding, lifting and lowering a corresponding one of said plurality of jack rods relative to said grid, wherein each hydraulic jack comprises:

a hydraulically operated holding mechanism having holders arranged to selectively engage said jack rod to hold said jack rod in place; and a hydraulically operated lifting mechanism having lifters arranged to selectively engage said jack rod and a lift cylinder arranged to lift said lifters and said jack rod therewith when said holders are disengaged and said lifters are engaged.

5. A control rod drive system as recited in claim 4, further comprising a plurality of hydraulic lines for supplying hydraulic fluid to said hydraulic jacks, said hydraulic lines including a plurality of holding lines and a plurality of lifting lines, wherein each holding line supplies hydraulic fluid to a plurality of hydraulic jacks and each lifting line supplies hydraulic fluid to a plurality of hydraulic jacks, and wherein each of said plurality of hydraulic jacks further comprises:

a hold control valve that is moveable between an open position and a closed position wherein in said open position a communication path is formed between an associated holding line and a control line that is associated with said hydraulic jack; and wherein said holding mechanism further comprises a holding piston arranged to move said holders between engaged and disengaged positions, a first side of said holding piston being influenced by the pressure in said associated holding line and a second side of said piston being influenced by the pressure in said associated control line; and wherein said lifting cylinder is influenced by the pressure in said associated control line.

6. A control rod drive system as recited in claim 5, wherein each hold control valve comprises:

a plunger that is moveable between an open position and a closed position;

biasing means for biasing said plunger towards said closed position; and wherein said associated lifting and holding lines are each arranged to influence said plunger in a direction towards said open position.

7. A control rod drive for positioning a control rod relative to a plurality of fuel rods at any one of a plurality of axial positions along a vertical axis, including a first axial position whereat said control rod is located above and removed from in between said plurality of fuel rods and a second position whereat said control rod is inserted in between said plurality of fuel rods, comprising:

a jack rod coupled to a top portion of said control rod, said jack rod having indexing means formed on a surface thereof; and hydraulically operated means for engaging said indexing means without lifting said jack rod in a first hydraulic state and for engaging said indexing means with lifting of said jack rod in a second hydraulic state.

8. The control rod drive as defined in claim 7, wherein said indexing means comprises a plurality of notches formed on said surface of said jack rod and spaced at equal intervals along said vertical axis.

9. The control rod drive as defined in claim 7, wherein said hydraulically operated means comprises first engagement means for engaging said indexing means when said hydraulically operated means are in said first or second hydraulic state, and second engagement means for engaging said indexing means in said first hydraulic state but not in said second hydraulic state.

10. The control rod drive as defined in claim 8, wherein said hydraulically operated means comprises a first latching mechanism which engages one of said notches when said hydraulically operated means are in said first or second hydraulic state, and a second latching mechanism which engages another of said notches when said hydraulically operated means are in said first hydraulic state but does not engage any one of said notches when said hydraulically operated means are in said second hydraulic state.

11. The control rod drive as defined in claim 9, wherein said hydraulically operated means comprises lifting means which displace said first engagement means vertically upward in said second hydraulic state.

12. The control rod drive as defined in claim 11, wherein said first engagement means and said lifting means are connected to a first hydraulic line for supplying pressurized hydraulic fluid at a first pressure in said first hydraulic state and at a second pressure in said second hydraulic state, said second pressure being greater than said first pressure.

13. The control rod drive as defined in claim 12, wherein said lifting means comprising a lift cylinder which is axially slidable inside a cylindrical casing and a first biasing means for urging said lift cylinder upward relative to said casing, and said first engagement means comprises a lift piston which is radially slidable in a cylindrical bore formed in said lift cylinder and a second biasing means for urging said lift piston away from said jack rod, said lift cylinder further comprising channel means for enabling flow communication between said first hydraulic line and said cylindrical bore.

14. The control rod drive as defined in claim 12, further comprising control valve means for disengaging said second engagement means from said indexing means in response to pressurized hydraulic fluid above a predetermined threshold pressure in said first hydraulic line, said predetermined threshold pressure being greater than said first pressure.

15. The control rod drive as defined in claim 14, wherein said second engagement means comprises a hold piston which is radially slidable in a first cylinder and a biasing means for urging said hold piston away from said jack rod, one side of said hold piston always being in flow communication with said second hydraulic line, and the other side of said hold piston being in flow communication with said second hydraulic line only when said control valve means has been placed in an open state in response to pressurized hydraulic fluid above a predetermined threshold pressure in said first hydraulic line.

16. A control rod drive for positioning a control rod relative to a plurality of fuel rods at any one of a plurality of axial positions along a vertical axis, including a first axial position whereat said control rod is located above and removed from in between said plurality of fuel rods and a second position whereat said control is inserted in between said plurality of fuel rods, comprising:
 a jack rod coupled to a top portion of said control rod, said jack rod having indexing means formed on a surface thereof; and
 first hydraulically operated engagement means for engaging said indexing means in a first hydraulic state and disengaging said indexing means in a second hydraulic state,
 wherein said jack rod is locked against displacement along said vertical axis when said first hydraulically operated engagement means engages said indexing means.

17. The control rod drive as defined in claim 16, further comprising second hydraulically operated engagement means for engaging said indexing means in said first and second hydraulic states, and lifting means for displacing said second hydraulically operated engagement means vertically upward in said second hydraulic state.

18. The control rod drive as defined in claim 17, wherein said second hydraulically operated engagement means and said lifting means are connected to a first hydraulic line for supplying pressurized hydraulic fluid at a first pressure in said first hydraulic state and at a second pressure in said second hydraulic state, said second pressure being greater than said first pressure.

19. The control rod drive as defined in claim 18, wherein said lifting means comprising a lift cylinder which is axially slidable inside a cylindrical casing and a first biasing means for urging said lift cylinder upward relative to said casing, and said second hydraulically operated engagement means comprises a lift piston which is radially slidable in a cylindrical bore formed in said lift cylinder and a second biasing means for urging said lift piston away from said jack rod, said lift cylinder further comprising channel means for enabling flow communication between said first hydraulic line and said cylindrical bore.

20. The control rod drive as defined in claim 18, further comprising control valve means for disengaging said first hydraulically operated engagement means from said indexing means in response to pressurized hydraulic fluid above a predetermined threshold pressure in said first hydraulic line, said predetermined threshold pressure being greater than said first pressure.

21. The control rod drive as defined in claim 20, wherein said first hydraulically operated engagement means comprises a hold piston which is radially slidable in a first cylinder and a biasing means for urging said hold piston away from said jack rod, one side of said hold piston always being in flow communication with said second hydraulic line, and the other side of said hold piston being in flow communication with said second hydraulic line only when said control valve means has been placed in an open state in response to pressurized hydraulic fluid above a predetermined threshold pressure in said first hydraulic line.

* * * * *